United States Patent
Kalish

(10) Patent No.: US 9,810,804 B2
(45) Date of Patent: Nov. 7, 2017

(54) COLLECTING AND TRANSMITTING CONTROL SOURCE ELECTROMAGNETIC SIGNALS

(71) Applicant: Deep Imaging Technologies, Inc., Tomball, TX (US)

(72) Inventor: Alexander Edward Kalish, The Woodlands, TX (US)

(73) Assignee: Deep Imaging Technologies, Inc., Tomball, TX (US)

( * ) Notice: Subject to any disclaimer, the term of this patent is extended or adjusted under 35 U.S.C. 154(b) by 88 days.

(21) Appl. No.: 14/198,303

(22) Filed: Mar. 5, 2014

(65) Prior Publication Data
US 2014/0184227 A1    Jul. 3, 2014

Related U.S. Application Data

(63) Continuation of application No. 13/187,759, filed on Jul. 21, 2011, now abandoned.

(60) Provisional application No. 61/366,916, filed on Jul. 22, 2010.

(51) Int. Cl.
| | | |
|---|---|---|
| G01V 3/12 | (2006.01) | |
| G01V 3/38 | (2006.01) | |
| G01V 3/08 | (2006.01) | |

(52) U.S. Cl.
CPC .............. *G01V 3/12* (2013.01); *G01V 3/083* (2013.01); *G01V 3/38* (2013.01)

(58) Field of Classification Search
CPC .......... G01V 3/12; G01V 3/38; E21B 47/122; H04B 13/02
USPC ........... 702/2, 7, 13, 75, 191; 324/334, 337, 324/338, 354, 359; 455/93, 118
See application file for complete search history.

(56) References Cited

U.S. PATENT DOCUMENTS

| | | |
|---|---|---|
| 4,152,652 A | 5/1979 | Taylor |
| 4,862,514 A | 8/1989 | Kedjierski |
| 6,167,249 A | 12/2000 | Hereford et al. |
| 6,230,000 B1 | 5/2001 | Tayloe |
| 6,253,100 B1 | 6/2001 | Zhdanov |
| 7,023,213 B2 | 4/2006 | Nichols |
| 7,203,599 B1 | 4/2007 | Strack et al. |
| 7,337,064 B2 | 2/2008 | MacGregor et al. |
| 7,483,792 B2 | 1/2009 | MacGregor et al. |
| 7,502,690 B2 | 3/2009 | Thomsen et al. |
| 7,529,529 B2 | 5/2009 | Taylor |
| 7,565,245 B2 | 7/2009 | Andres et al. |

(Continued)

FOREIGN PATENT DOCUMENTS

WO    2010069055 A1    6/2010

OTHER PUBLICATIONS

PCT International Search Report International Application No. PCT/US 12/30992, dated Jun. 20, 2012, 7 pages.

(Continued)

*Primary Examiner* — John H Le
(74) *Attorney, Agent, or Firm* — Blank Rome, LLP

(57) ABSTRACT

Concurrently measuring, correlating, and processing magnetic and electric field data includes measuring base band signals, and then up-converting those band signals to a higher frequency for filtering, while at the same time preserving phase and amplitude information. All timed elements in the system are rigorously synchronized. The increased data set results in improved signal-to-noise ratio and information correlation.

17 Claims, 10 Drawing Sheets

(56) References Cited

U.S. PATENT DOCUMENTS

| | | | |
|---|---|---|---|
| 7,805,249 B2 | 9/2010 | Summerfield et al. | |
| 7,822,562 B2 | 10/2010 | Dennis | |
| 7,941,273 B2 | 5/2011 | Thomsen et al. | |
| 2003/0094952 A1 | 5/2003 | Morrison et al. | |
| 2004/0000919 A1 | 1/2004 | Gupta et al. | |
| 2005/0227639 A1* | 10/2005 | Sorrells | H04B 1/16 455/118 |
| 2008/0094066 A1* | 4/2008 | Watts | G01V 3/083 324/337 |
| 2008/0105425 A1 | 5/2008 | MacGregor et al. | |
| 2008/0281524 A1 | 11/2008 | Rosten et al. | |
| 2009/0005994 A1 | 1/2009 | Srnka et al. | |
| 2009/0005997 A1 | 1/2009 | Willen | |
| 2009/0067546 A1 | 3/2009 | Willen | |
| 2009/0072831 A1 | 3/2009 | Summerfield et al. | |
| 2009/0082970 A1 | 3/2009 | Andreis et al. | |
| 2009/0103395 A1 | 4/2009 | Willen | |
| 2009/0120636 A1 | 5/2009 | Summerfield et al. | |
| 2009/0126939 A1 | 5/2009 | Lu et al. | |
| 2009/0204330 A1 | 8/2009 | Thomsen et al. | |
| 2009/0265111 A1 | 10/2009 | Helwig et al. | |
| 2009/0276189 A1 | 11/2009 | Willen et al. | |
| 2010/0018719 A1 | 1/2010 | Lu et al. | |
| 2010/0065266 A1 | 3/2010 | Wahrmund et al. | |
| 2010/0176791 A1 | 7/2010 | Dickens et al. | |
| 2010/0224362 A1 | 9/2010 | Carazzone | |
| 2010/0233955 A1 | 9/2010 | Hornbostel et al. | |
| 2011/0013481 A1 | 1/2011 | Clark | |
| 2011/0087435 A1 | 4/2011 | Hornbostel | |
| 2011/0166840 A1 | 7/2011 | Green et al. | |
| 2011/0210743 A1* | 9/2011 | Tompkins | G01V 3/12 324/338 |
| 2012/0010818 A1 | 1/2012 | Kalish | |
| 2012/0061092 A1 | 3/2012 | Willen | |
| 2012/0119743 A1* | 5/2012 | Singer | G01V 3/10 324/334 |
| 2012/0134671 A1* | 5/2012 | Edwards | G01V 3/12 398/43 |

OTHER PUBLICATIONS

Swidinsky, "Transient Electromagnetic Modelling and Imaging of Thins Resistive Structures: Applications for Gas Hydrate Assessment," A thesis submitted in conformity with the requirements for the degree of Doctor of Philosophy, Department of Physics, University of Toronto, 2011, 255 pages.

PCT Partial EP Search Report International Application No. PCT/US 2012 030992, dated Feb. 3, 2016, 7 pages.

Tossman, et al., (1979), "An underwater towed electromagnetic source for geophysical exploration", IEEE Journal of Oceanic Engineering, vol. 4(3), pp. 84-89.

* cited by examiner

COLLECTING AND TRANSMITTING CONTROL SOURCE ELECTROMAGNETIC SIGNALS

TECHNICAL FIELD

The invention relates to devices and processes for geophysical prospecting, and, more particularly, to the removal of noise typically associated with the data collection of Control Source Electromagnetic ("CSEM") and Magnetoturelic ("MT") signals.

BACKGROUND ART

There are many U.S. patents and patent applications related to electromagnetic surveying. Some of the more relevant ones appear to be the following: U.S. Pat. No. 6,253,100, for broad band electromagnetic holographic imaging; U.S. Pat. No. 7,203,599, for acquiring transient electromagnetic survey data; U.S. Pat. No. 7,337,064, for electromagnetic surveying for hydrocarbon reservoirs; U.S. Pat. No. 7,483,792, for electromagnetic surveying for hydrocarbon reservoirs; U.S. Pat. No. 7,502,690, for using time-distance characteristics in acquisition of t-CSEM data; U.S. Pat. No. 7,565,245, for electromagnetic surveying; U.S. Pat. No. 7,805,249, for controlled source electromagnetic surveying with multiple transmitters; U.S. Pat. No. 7,822,562, for removing air wave noise from electromagnetic survey data; U.S. Pat. No. 7,941,273, for using time-distance characteristics in acquisition of T-CSEM data; 20080105425, for electromagnetic surveying for hydrocarbon reservoirs; 20090005994, for time lapse analysis with electromagnetic data; 20090005997, for spatial filtering of electromagnetic survey data; 20090067546, for compensating electromagnetic data; 20090072831, for real time monitoring of the waveform transmitted by an electromagnetic survey; 20090082970, for electromagnetic surveying; 20090103395, for wavelet denoising of controlled source electromagnetic survey data; 20090120636, for controlled source electromagnetic surveying with multiple transmitters; 20090126939, for electromagnetic data processing system; 20090204330, for using time-distance characteristics in acquisition of T-CSEM data; 20090265111, for signal processing of marine electromagnetic signals; 20090276189, for estimating noise at one frequency by sampling noise at other frequencies; 20100018719, for inversion of CSEM data with measurement system signature suppression; 20100065266, for controlled source electromagnetic reconnaissance surveying; 20100176791, for correcting the phase of electromagnetic data; 20100224362, for electromagnetic imaging by four dimensional parallel computing; 20100233955, for electromagnetic air-wave suppression by active cancellation; 20110013481, for detecting marine deposits; and 20110087435, for electromagnetic prospecting waveform design. All of these patents and patent applications are incorporated herein by this reference.

Several techniques exist that attempt to remove air wave noise and other noise sources from the signal of interest in a CSEM system. These techniques include active filtering, signal encoding such as grey coding, and noise estimation and subtraction at different frequencies. Additionally, until recently, all of these techniques were supplemented by physical isolation of the receiving elements from the noise source, by submersion in a marine environment, thus using the water as an air wave signal filter. These methods are typified in the above-listed U.S. patent applications 2009/0204330, 2009/0265111, 2009/0276189, 2011/0013481, and in U.S. Pat. No. 7,822,562.

The major problem with these techniques is that they are unable to successfully filter out in-frequency noise because the frequency of interest is very close to the frequency of the noise, that is, typically between fifty and sixty hertz (50-60 hz).

In addition, for the purposes of operation on the surface, there are many more sources of noise and amplification of noise, such as rail lines, pipelines and barbed wire fences, that is, anything that is ferrous and long. The typical solution to these noise problems is to survey the area before performing a CSEM survey, and remove the known anomalies from the data. Items can be missed in the preliminary survey, causing additional unexpected noise in the data, and thus reducing delineation and depth of investigation. A person skilled in the art of performing CSEM surveying will understand the issues that uncontrolled noise can cause when using existing systems for surface based measurements. The use of CSEM for surveying is described in U.S. Pat. No. 7,203,599.

In light of the foregoing, a need remains for a system and method of visualizing sub-surface formations that reduces noise, and improves resolution.

SUMMARY OF INVENTION

The present invention improves the visualization of sub-surface formations in a static state by reducing noise, and improving resolution. Multiple simultaneous channels of E and H field data using high speed data acquisition techniques coupled with advanced noise filtering techniques and more precise determination of phase data, allows for the rapid interpretation of 2D, 3D, and 4D data in CSEM operations to greater depths and finer bin resolution.

The receiver system of the present invention is able to detect the transient states being caused by either removing fluid or gas from the formation, or imposing fluid and propant under pressure during fracturing operations.

The invention takes the differential signal and up-converts it to a higher frequency, imposes RF noise filtering techniques at the higher frequency, and preserves both phase and amplitude information from the original signal. The inventive technique allows software to control the frequency at which the system will collect data, and the frequencies of data that are rejected. The method of the present invention includes a source clock with a low phase jitter and a method to synchronize the transmitter system with receiver systems. In addition, the current invention implements an enhanced method for obtaining induced magnetic field data that produces improved granularity in formation data.

DESCRIPTION OF EMBODIMENTS

In the preferred embodiment a plurality of receivers are arranged to collect data that is used to create images of the physical features within sub-surface formations. The receiver system measures the potential difference of the decaying electric field signal and surface currents caused by a CSEM transmitter pulse, between at least two widely spaced electrodes that are driven into the ground. In addition the receiver measures the magnetic fields that result from the excitation caused by a CSEM transmitter. The transmitter system generates a precisely controlled high power transmitted wave form that is synchronized in phase with the receiving systems.

Figure 1A:
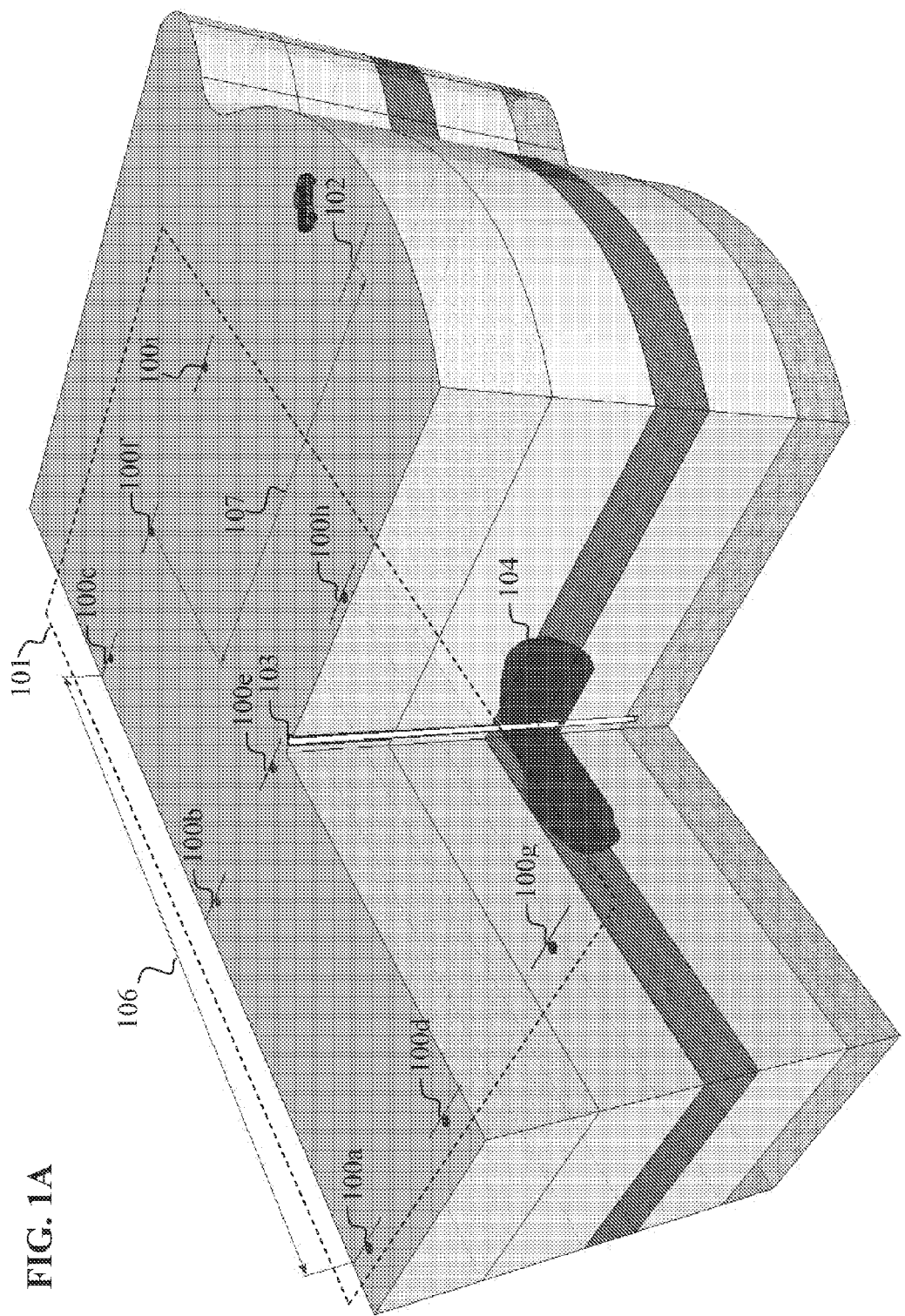
FIG. 1A depicts a receiver layout in the form of a matrix of receivers.

Referring to FIG. 1A, in the preferred embodiment a plurality of time-synchronized receiver systems 100 are assembled as depicted, 100a, 100b, 100c, 100d, 100e, 100f, 100g, 100h and 100i to form a receiver matrix 101 around or offset from a wellhead 103. In a typical setup the receiver matrix 101 extends over an area of one kilometer square 106. Any number of receiver systems 100 can be used to form the matrix 101. A CSEM transmitter 102 is placed in accordance with the requirements of the CSEM survey for a plurality of subsurface formations 104, and is a distance of greater than five hundred meters 107, from the middle of the receiver matrix 101 to ensure the CSEM transmitter 102 is offset from the receiver matrix 101. The requirements for a CSEM survey can be understood by any person familiar with the practice of CSEM surveying.

Figure 1B:
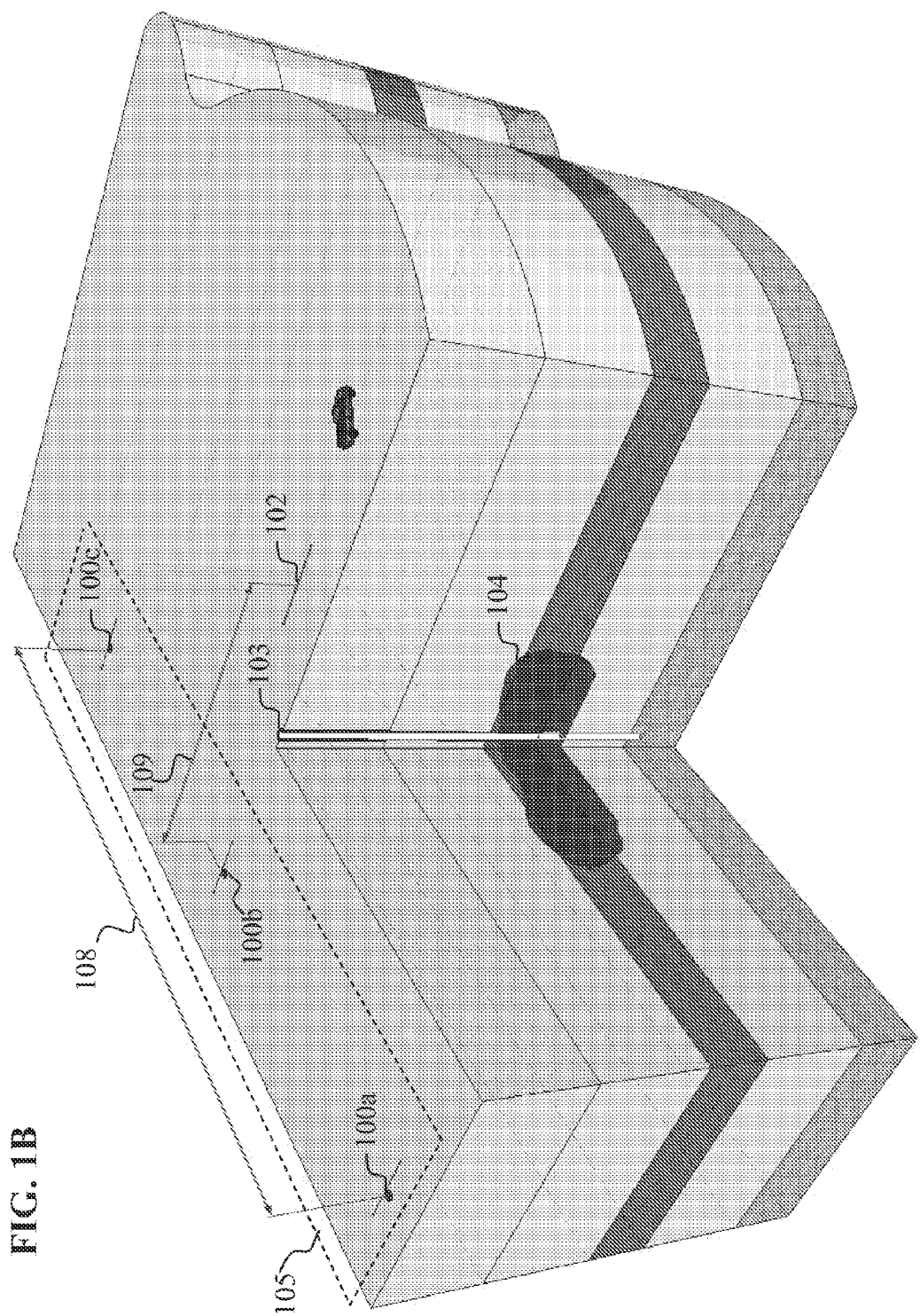
FIG. 1B depicts an alternate receiver layout in the form of a string of receivers.

Referring now to FIG. 1B, an alternate embodiment allows for the assembly of a plurality of time-synchronized receiver systems 100 to form a receiver string 105 as depicted by 100a, 100b and 100c. In a typical setup the receiver string 105 extends over a distance of 1 KM 108 and the CSEM transmitter 102 is placed at a distance of approximately 500 meters 109, from the receiver string 105. In a further alternate embodiment at least one receiver string 105 is used in conjunction with the action of repositioning the receiver matrix 100 after each set of data has been received and collected. All of the embodiments of the method of the present invention include the step of accurately locating the receiver systems 100 relative to each other and the CSEM transmitter 102. That step is shown as step 725 in FIG. 7.

Figure 2:
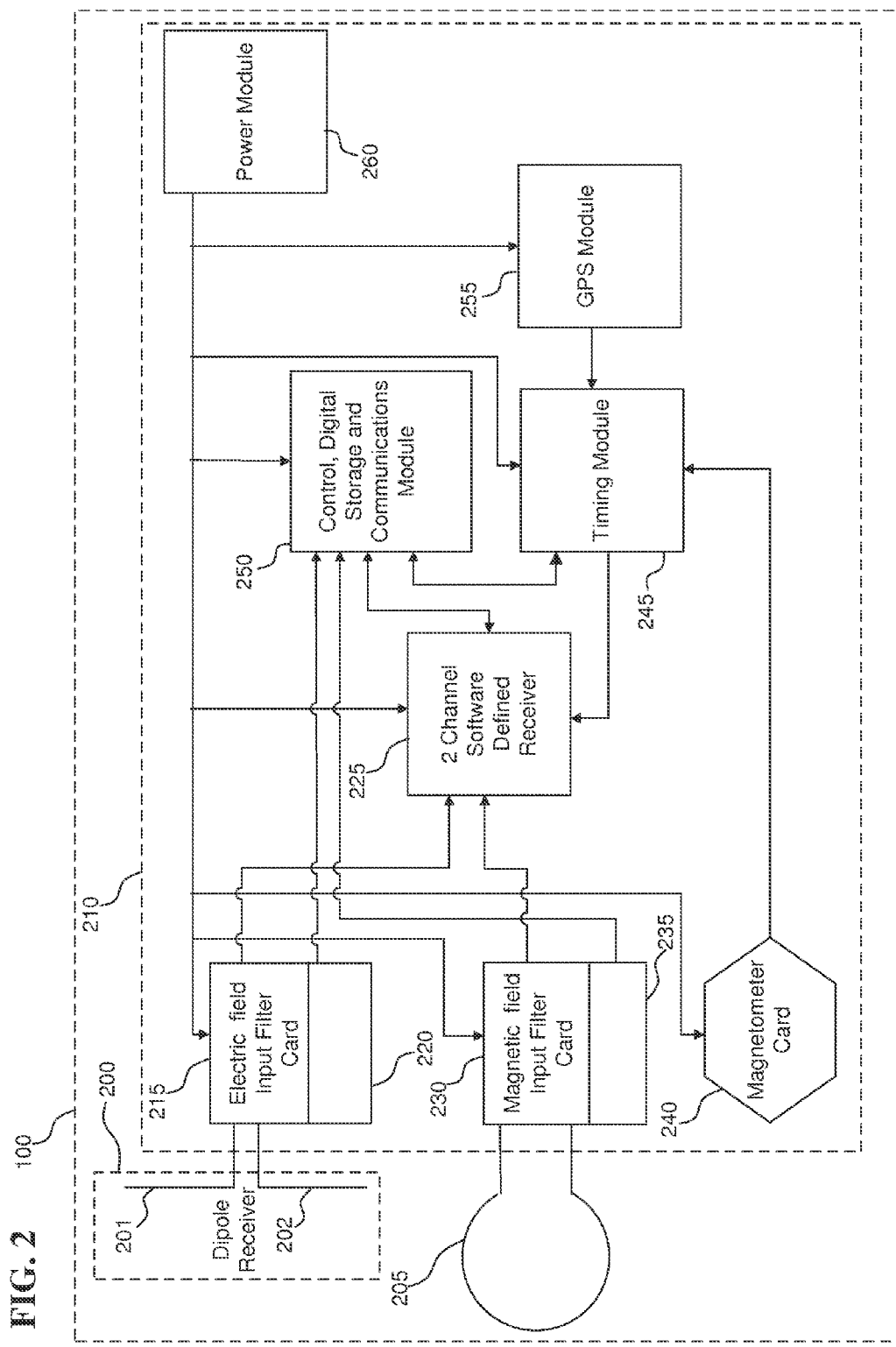
FIG. 2 Is a block diagram of the modules that are contained within a receiver system.

Referring now to FIG. 2, the receiver system 100 includes several sub-systems and sensor groups. In the preferred embodiment, a dipole receiver 200 contains electrodes 201 and 202. A magnetic field loop antenna 205 connects to an electronics assembly 210. The electronics assembly 210 includes an electric field input filter card 215, a surface electric current detector circuit 220, a two-channel Software Defined Receiver (SDR) 225, a magnetic field input filter card 230, a magnetic point potential circuit 235, a Magnetometer Card (MC) 240, a Timing Module (TM) 245, a Control, Digital Storage, and Communications Module 250, a GPS Module 255 and a Power Module 260.

Figure 3:
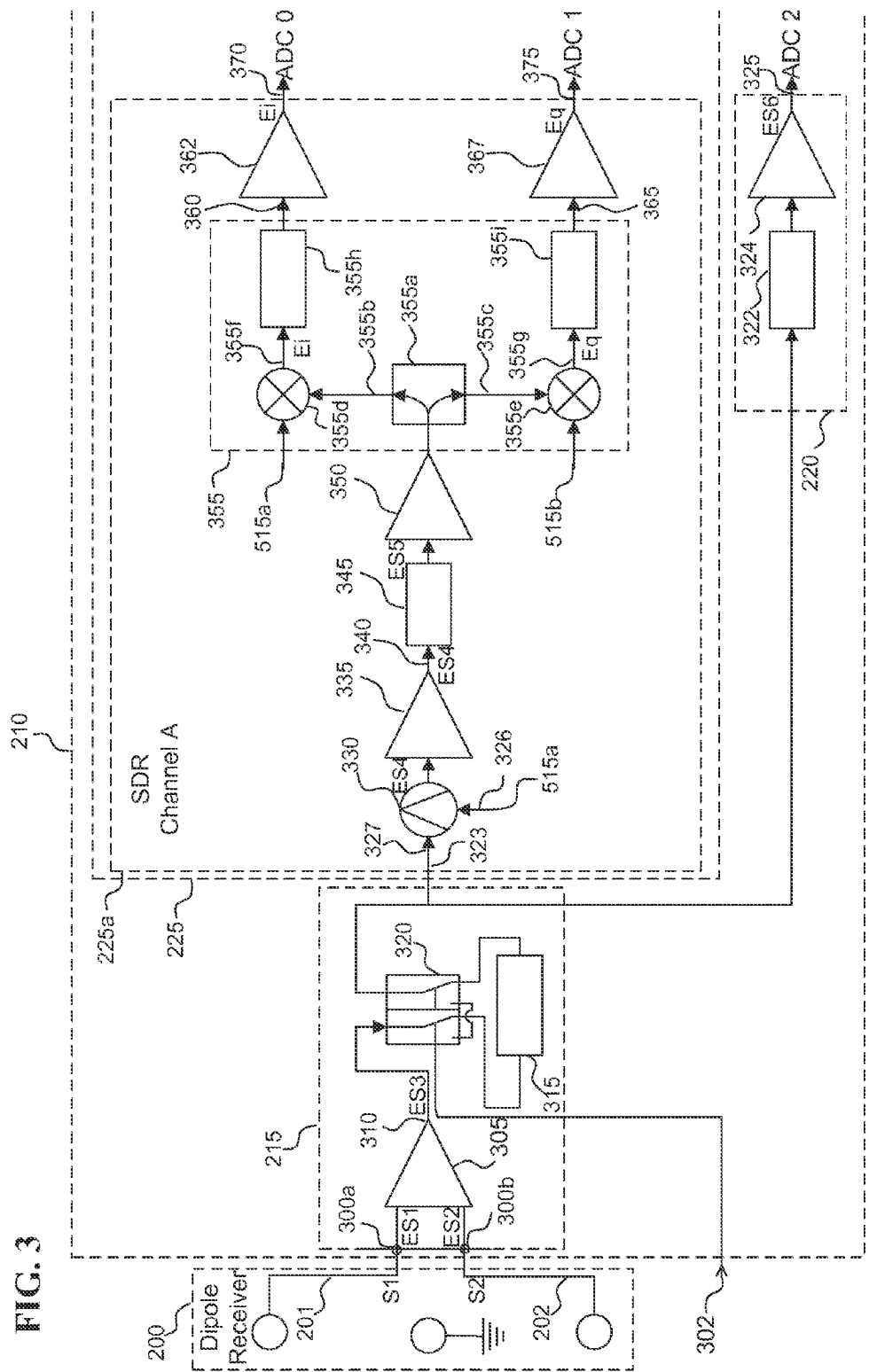
FIG. 3 is a block diagram of the electric field portion of the receiver system.

Referring now to FIG. 3, in the preferred embodiment, for each of the receiver systems 100 the two electrodes 201 and 202 are widely spaced and inserted into the surface of the earth. The dipole receiver 200 receives the electric field resulting from a synchronized transmitter pulse. The electrodes 201 and 202 are conductively coupled to a pair of signal inputs 300a and 300b in the electronics assembly 210. A pair of signals, ES1 and ES2 are received through the electrodes 201 and 202, and pass into the E field Input Filter card 215. A common mode amplifier 305 receives the signals ES1 and ES2 and outputs a difference signal ES3 at an output 310. The output 310 is conductively coupled to a power line filter 315. The power line filter 315 can be optionally removed from the circuit through a user activated switch 302, which is connected to a relay switch 320. The output of the power line filter 315 is conductively coupled to an input channel of the SDR 225. Alternatively, the output 310 of the common mode amplifier 305 bypasses the power line filter 315, and conductively couples to a channel of the SDR 225.

The output 310 is conductively coupled to the surface electric current detector circuit 220, and thus the ES3 signal at the output 310 is passed through a low pass filter 322 and an amplifier 324. An output signal ES6, at an output 325, is the surface electric direct current (DC). The output 325 is conductively coupled to a 24-bit analog-to-digital converter (ADC) 600 shown in FIG. 6.

The difference signal ES3 is present at an input 323 (also known as "Port A" of the actual mixer circuit 330) to a channel 225a of the SDR 225. The difference signal ES3 is passed to a capacitively coupled input 327 of a high dynamic range mixer circuit 330. In the preferred embodiment, the mixer circuit 330 is a MiniCircuits Model SBL-1A+ (DC-100 MHz version), manufactured by MiniCircuits in Brooklyn, N.Y.

Input 326 (also known as "Port B" of the actual MiniCircuits mixer circuit 330) is supplied with a 25 dbm signal 515a, generated from a high stability source in the timing module 245. The frequency of the signal 515a is controlled by software executing in a micro processor in the Control, Digital Storage, and Communications Module 250. The frequency of the signal 515a can be set to any one of a wide range of frequencies. In the preferred embodiment of the present invention the frequency is set to 9 Mhz.

The frequency of the incoming signal ES3 is up-converted by the mixer circuit 330. An output of the mixer circuit 330 is connected conductively to a 40 db gain IF amplifier 335. An output 340 of the IF amplifier 335 is conductively connected to the input of a combination Cohn filter and a diplexer circuit 345. The diplexer circuit is to help with matching and minimal phase distortion. In the preferred embodiment, the Cohn filter design is one sold by Clifton Laboratories, Clifton, Va., and can be understood by a person familiar with the art of RF filter design. In an alternate embodiment, the Cohn filter in the Cohn filter and diplexer circuit 345 can be replaced by any RF band pass filter that can be digitally controlled.

The output of the Cohn filter and the diplexer circuit 345 has a signal ES5. The output of the Cohn filter and the diplexer circuit 345 is conductively coupled to a low noise Intermediate Frequency (IF) amplifier 350. In the preferred embodiment, the amplifier 350 is the Analog Devices AD9855, manufactured by Analog Device Inc, Norwood, Mass. 02062-9106. The amplification of the signal ES5, in the IF amplifier 350 stage is 12 db, and is designed to regain the signal loss through the Cohn filter and the diplexer circuit 345.

The output of the IF amplifier 350 is conductively coupled to the input of an Enhanced Tayloe detector (ETD) circuit 355. At the input to the ETD circuit 355 the signal is coupled to a power splitter 355a. The power splitter 355a galvanically isolates two outputs 355b and 355c that are conductively coupled to two separate Tayloe detector circuits 355d and 355e respectively. The Tayloe detector circuits 355d and 355e are implemented using CMOS components. Using two separate Tayloe detector circuits 355d and 355e, for resolving the in-phase and quadrature signals from the same input signal ES5, reduces cross talk and signal noise between two outputs 360 and 365.

The Tayloe detector circuits 355d and 355e are fed two 8,999,000 Hz clock signals, an in-phase clock signal 515a, and a quadrature out-of-phase clock signal 515b respectively. (Signals 515a and 515b are shown only in FIG. 5.) The signals 515a and 515b are generated from the same source in the timing module 245 (shown in FIG. 5), and are separated by a phase shift of 90 degrees. The Tayloe detector circuits 355d and 355e generate an in-phase signal Ei present at 355f and a quadrature signal Eq present at 355g respectively, at frequencies between 0.01 Hz and 50 KHz. The in-phase signal 355f contains the amplitude information, and the quadrature signal 355g contains the phase information, of the original electromagnetic field signal ES3 at the output 310.

The Enhanced Tayloe detector circuit 355 can be understood by any person skilled in the art of superheterodyne radio frequency (RF) design.

The signals Ei, present at 355f, and Eq, present at 355g, are passed to bandpass diplexer networks 355h and 355i respectively. The outputs 360 and 365 of the bandpass diplexer networks are each buffered by low noise amplifiers 362 and 367 respectively. The low noise amplifiers 362 and 367 output a pair of signals 370 and 375 respectively that are each passed to the control module 250. The bandpass diplexer networks 355h and 355i can be understood by a person familiar with the art of RF radio design. In the preferred embodiment, the diplexer design is at the Amateur and Short Wave Radio Electronics Experimenter's Web Site.

The three streams of digital data representing the instantaneous values of the signals Ei, present at 370, Eq, present at 375, and ES6, present at 325, over time are stored in the control module 250, in a bulk memory store 615. The data is stored in the industry standard SEG-D format.

Figure 4:
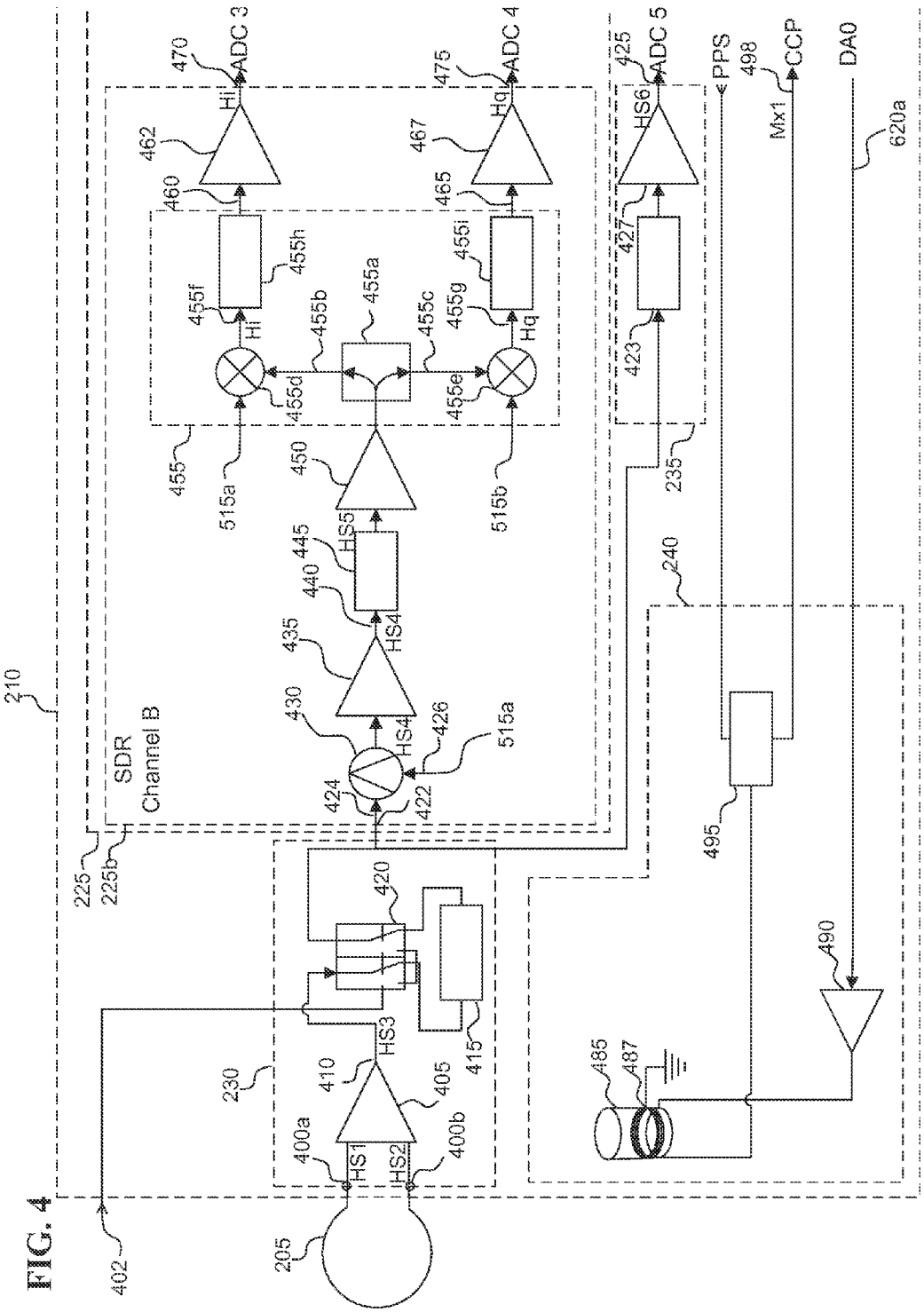
FIG. 4 is a block diagram of the magnetic field portion of the receiver system.

Referring now to FIG. 4, in the preferred embodiment the H-field detector consists of the loop antenna 205, the filter card 230, the magnetic point potential circuit 235, a second channel 225b of the SDR 225, and the magnetometer card 240.

The signals HS1 and HS2, from the magnetic field loop antenna 205, are present at inputs 400a and 400b. The inputs 400a and 400b are coupled to an H field filter card 230. The output of the H field filter card 230 is conductively coupled to channel 255b of the SDR 225. A second channel 225b of the SDR 225 has two output signals, Hi present at 470, and Hq present at 475, that are passed through to the control module 250.

The assembly, purpose, and operation of the circuit elements and sub elements within the depicted blocks 230, 225b, an Enhanced Tayloe detector (ETD) circuit 455, and 235, and the depicted sub elements 400a, 400b, 405, 410, 415, 420, 422, 424, 426, 430, 435, 440, 445, 450, 455a, 455b, 455c, 455d, 455e, 455f, 455g, 455h, 455i, 460, 465, 462, 467, 470, 423, 427 and 425 in FIG. 4, are identical to those of the elements 215, 225a, 335 and 220, and the depicted sub elements 300a, 300b, 305, 310, 315, 320, 323, 327, 326, 330, 335, 340, 345, 350, 355a, 355b, 355c, 355d, 355e, 355f, 355g, 355h, 355i, 360, 365, 362, 367, 270, 375, 322, 324 and 325 respectively in FIG. 3, as recited in the description for FIG. 3.

In an alternate embodiment the wire loop in the loop antenna 205 is replaced by a solenoid. The solenoid is a wire wound core with a high number of turns of Linz wire, and is center tapped.

The signal 620a (see FIG. 6) is passed to the buffer 460 and to the field null coil 487. The signal 620a can be derived from a potentiometer or the output of a Digital to Analog converter 620 (see FIG. 6) and is used to null the local magnetic field from the magnetometer.

At least one of the outputs on an X-axis magnetometer 485 can be coupled to at least one of the three inputs in the magnetometer card 240. Local ambient field effects are negated by the field null coil 487, as is typical in CSEM systems. In the preferred embodiment the X-axis magnetometer 485 is designed to detect fields that are parallel to the earth's surface. At least one of the magnetometer outputs is coupled to a divide-by-n counter 495. The output of the divide-by-n counter 495 is passed to a capture-and-compare input in a microprocessor in the control module 250.

The four signals, Hi present at 470, Hq present at 475, HS6 present at 425, and Mx1 present at 498, are passed to the control module 250. The four streams of digital data representing the instantaneous values of the signals Hi, Hq, Hs4, and Mx1, over time are stored to the control module 250, in a bulk memory store 615. The data is stored in the industry standard SEG-D format.

Figure 5:
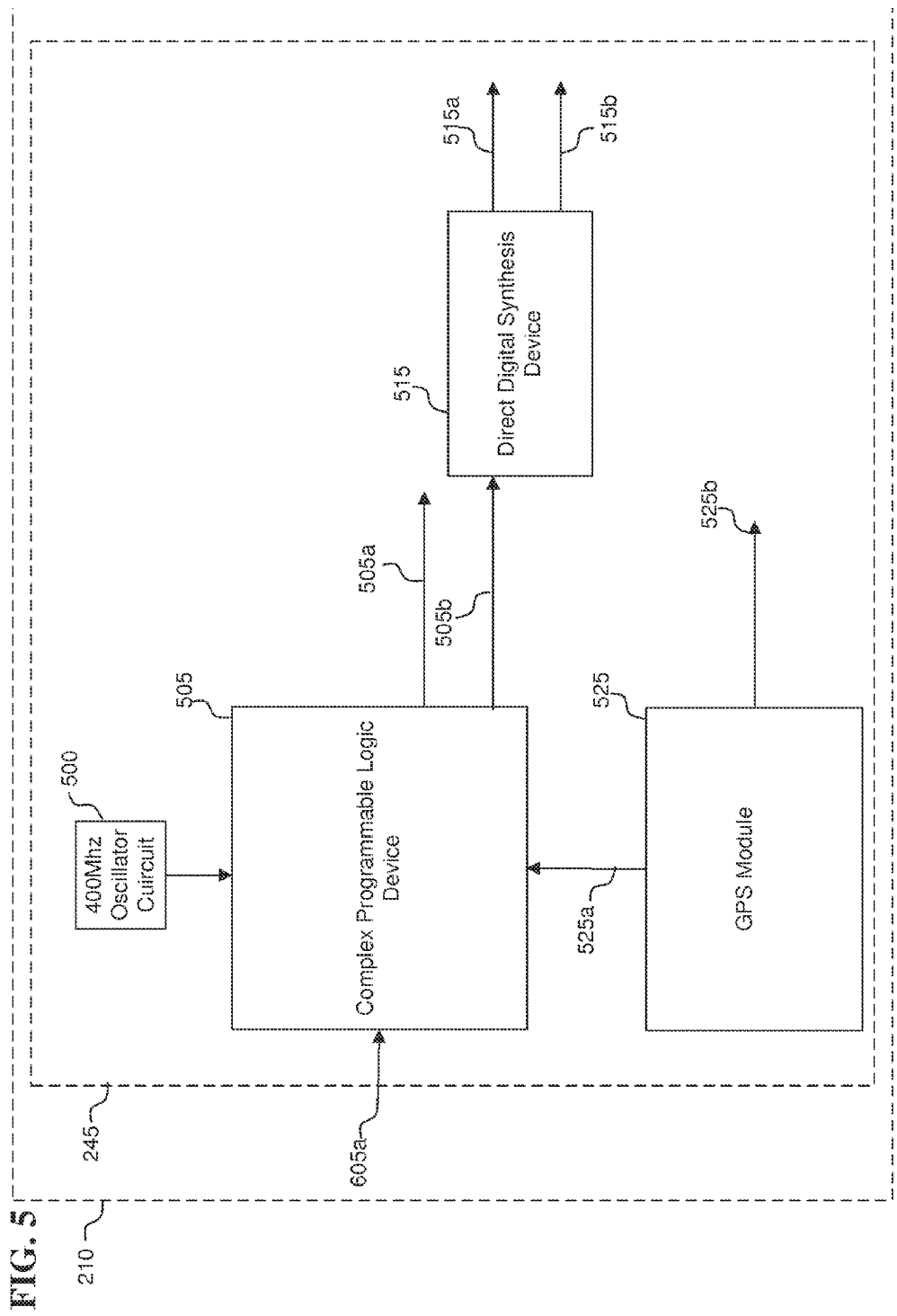
FIG. 5 is a block diagram of the timer module of the receiver system.

Referring to FIG. 5, the timing module 245 receives at least one low drift, phase accurate timing signal. In the preferred embodiment the master clock is sourced from a 400 Mhz oscillator 500. In the preferred embodiment, the oscillator is the NBXSBB023 400 Mhz LVPECL clock oscillator selected for 20 ppm accuracy, manufactured by On Semiconductor of Phoenix, Ariz.

The 400 Mhz oscillator 500 is connected to a Complex Programmable Logic Device (CPLD) 505. The signal is divided down to a 50 Mhz clock signal 505a and a 27 Mhz clock signal 505b. In the preferred embodiment, the CPLD 505 is the Xilinx 3C256 CPLD, manufactured by Xilinx, Inc. 2100 Logic Drive, San Jose, Calif. 95124, U.S.A. The CPLD 505 is partially programmed as a divider, and is controlled by the control module 250 through a control bus 605a (shown in FIG. 6). The 50 Mhz clock signal 505a is coupled to a Direct Digital Synthesis (DDS) device 515, the semiconductor AD 9958 manufactured by Analog Devices Inc. of Norwood, Mass., USA. The DDS device 515 is used to create two clock signals. The first clock signal is in phase with the 400 Mhz oscillator 500, and is the in-phase clock signal 515a. The second clock signal is offset by 90 degrees in phase from the 400 Mhz oscillator 500 and is the out-of-phase clock signal 515b. The in-phase clock signal 515a and the out-of-phase clock signal 515b are fed to the Enhanced Tayloe circuits 355 and 455. In addition the in-phase clock signal 515a is fed to the mixer circuits 330 and 430. The 27 Mhz clock signal 505a is supplied to the ADC 600 (shown in FIG. 6).

The CPLD 505 is synchronized to other receiver systems 100, through a synchronization pulse 525a from a GPS module 525. An exemplary piece of equipment to perform receiver system location and synchronization is a PG11 Global Positioning System receiver, manufactured by Laipac Tech of Richmond Ontario Canada. Synchronization of the CPLD 505 using the synchronization pulse for the GPS module 525, coupled with compensation for distance to satellite delays, provides for a method to completely synchronize all the receivers and transmitters in a CSEM setup.

In addition, a GPS serial data stream 525b is passed to the control module 250 for storage of location information.

In an alternate embodiment the 400 Mhz oscillator circuit 500 is input into a low jitter, low phase noise clock distribution semiconductor (CDS). The CDS generates the 27 Mhz clock 505a, for the ADC 600 and the 50 Mhz clock 505b for the DDS device 515. In the preferred embodiment, the CDS is the AD 9521, manufactured by Analog Device Inc., Norwood, Minn., U.S.A.

In another alternate embodiment the master clock is a rubidium atomic clock. In another alternate embodiment synchronization can also be achieved through a microprocessor 605, shown in FIG. 6.

Figure 6:
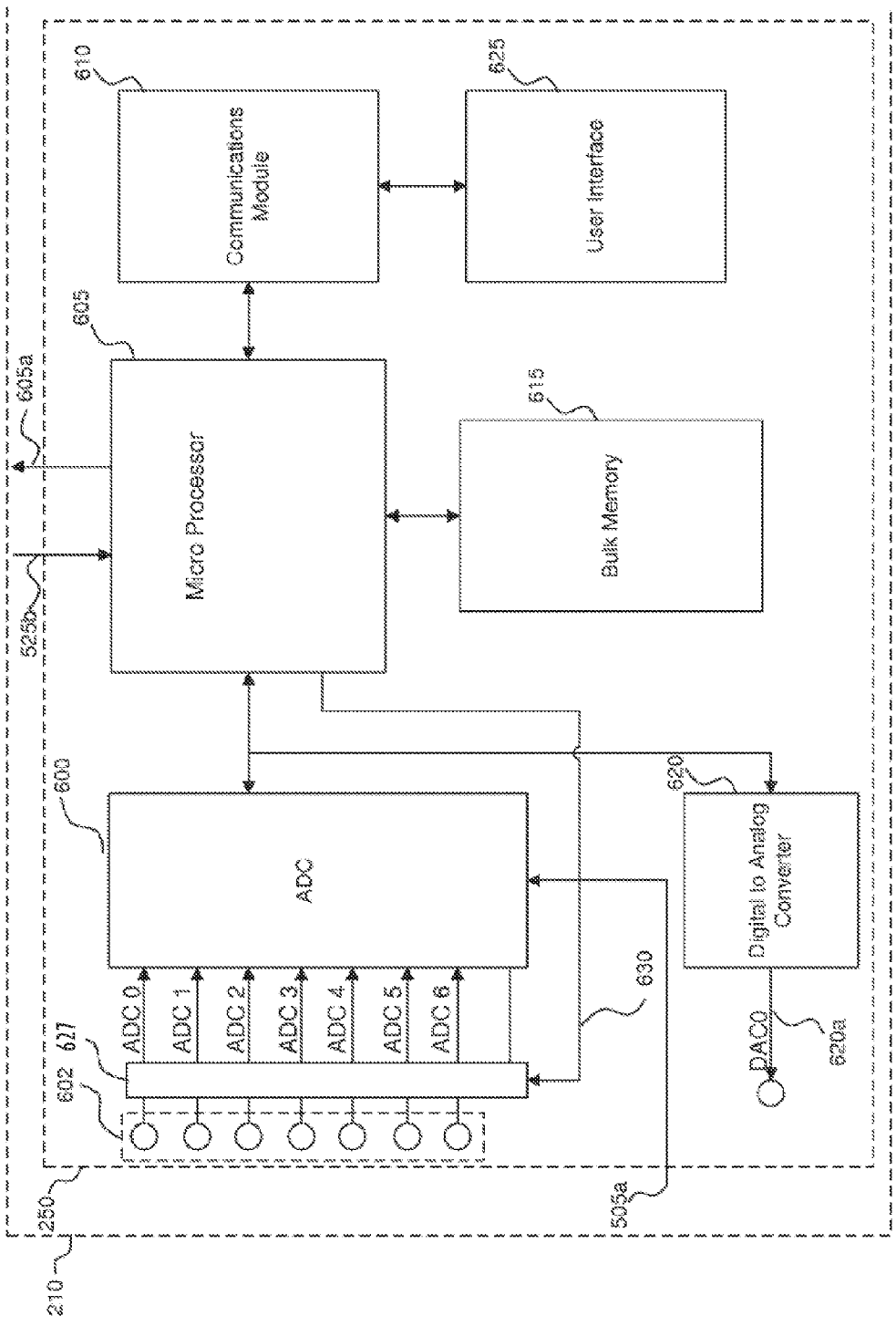
FIG. 6 is a block diagram of the control module of the receiver system.

Referring to FIG. 6, the control module 250 receives a plurality of signals 602 from the E surface electric current detector circuit 220, the magnetic point potential circuit 235, and the two channel SDR 225. The signals 602 pass through a plurality of clipper circuits 627 that are used to limit the amplitude of the input to the ADC 600. The ADC 600 can sample the incoming signals at any rate from 3.0 K samples per second (sps) to 255 K sps. The ADC 600 allows for significant oversampling of the data stream. In the preferred embodiment, the ADC 600 is the AD 1278 manufactured by Analog Device Inc., Norwood, Minn.

The clipper circuits 627 are synchronized by a signal 630 from the microprocessor 605 that uses data from the magnetometer card 240 to detect the air wave. The signal from the magnetometer card 240 causes the clipper circuit 627 to attenuate the received signals 602 until the airwave has passed. The signals 602 pass into the ADC 600 and are converted to a digital data stream that is passed to a microprocessor 605. In the preferred embodiment, the microcontroller 605 is the AVR32 manufactured by Atmel of San Jose, Calif.

The microprocessor 605 moves the data stream from the ADC 600 and stores the data stream in a bulk memory 615. The microprocessor also receives location information from the GPS serial data stream 525b and stores the data in the bulk memory 615.

A communications module 610 connects to a user interface (UI) 625. The UI 625 can be used to adjust and control aspects of the operation of the receiver system 100. In the preferred embodiment the UI 625 consists of a display and a user input device. In an alternate embodiment of the UI 625, the input is achieved through a series of switches and potentiometers.

A Digital to Analog Converter (DAC) 620 outputs a signal that is varied under microprocessor control until the ambient magnetic field is nulled in the X axis magnetometer 485.

Figure 7:
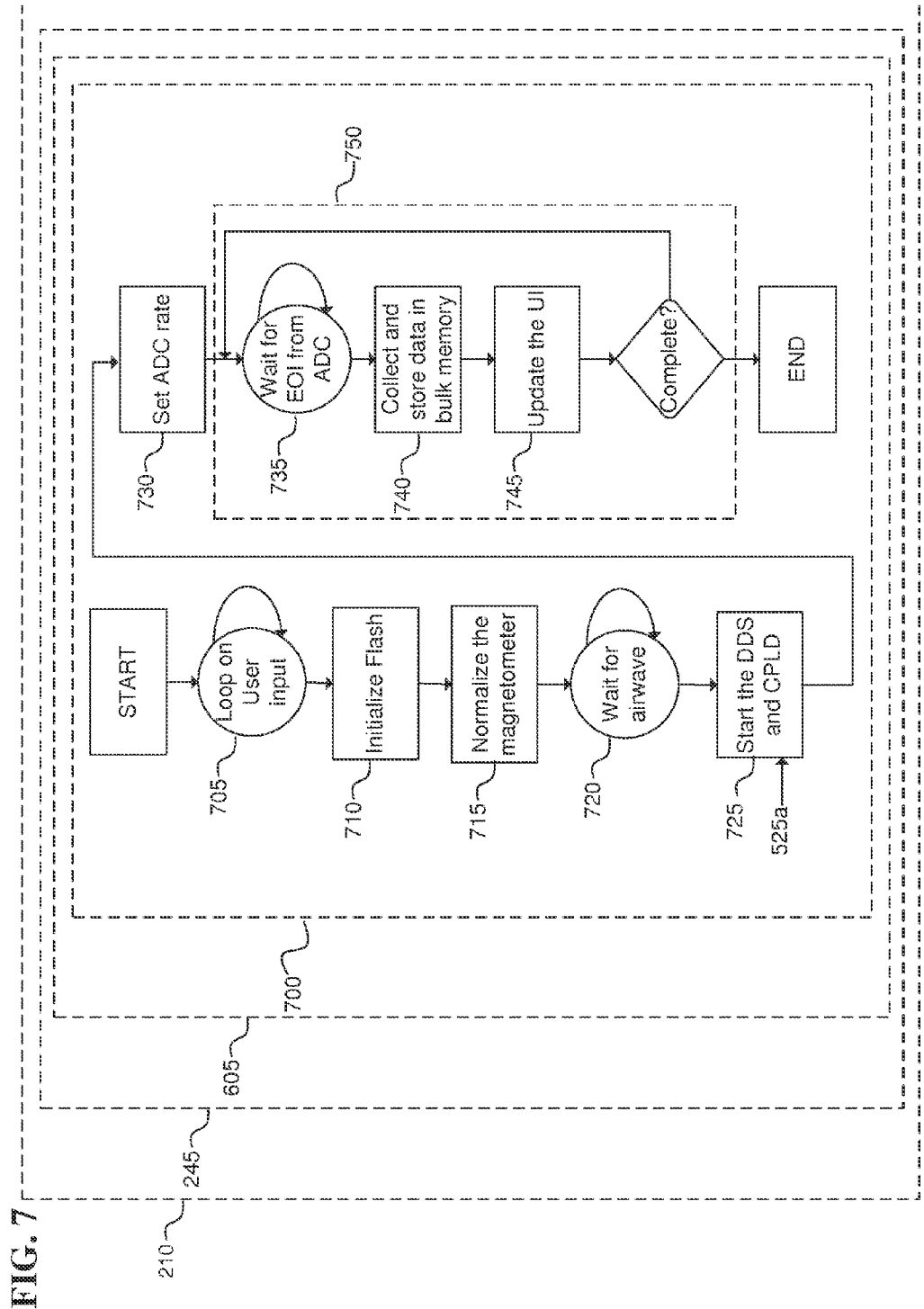
FIG. 7 is a flow chart of the logic of the method of the present invention.

Referring to FIG. 7, a software control program 700 executes on the microprocessor 605. The software control program 700 consists of a series of steps that can be controlled or adjusted by input from the user interface (UI) 625. The software control program 700 reads the input settings in step 705 from the front panel of the UI 625, and saves the settings to the bulk memory 615. The input settings define the SDR 225 by setting the up-converter frequency for the in-phase clock signal 515a, the down converter frequency for the in-phase clock signal 515a, and quadrature clock signal 515b of the enhanced Tayloe detectors 355 and 455. The combination of setting the up-converter frequency and the down converter frequencies creates an accurate software-defined band pass filter with a software-controlled center frequency.

In step 710, the software control program 700 initializes the flash file. Step 715 normalizes the magnetometer 485 to the linear region of operation. Step 720 waits for the air wave to be detected. Once the air wave has been detected, step 725 starts the DDS device 515 and CPLD 505 at a precise start time using the GPS Module 525 synchronization pulse 525a.

In step 730 the ADC 600 data rate is set initially to 190 Khz, and the ADC 600 is started. In step 735 the processor reads the ADC 600 data on an end of conversion interrupt from the ADC 600. In step 740 the data is stored in a standard format to the bulk memory. In step 745 the user interface display is updated, and any required data transmission is done through the communications module 610.

The system returns to step 735 to await the next end of conversion interrupt from the ADC 600. The system continues in a loop 750 until all data has been collected and stored into bulk memory 615. In an alternate embodiment, the step 705 includes the addition of entering, via the UI 625, a pre-defined range of frequencies that the SDR 225 will sweep through during data collection.

Figure 8:
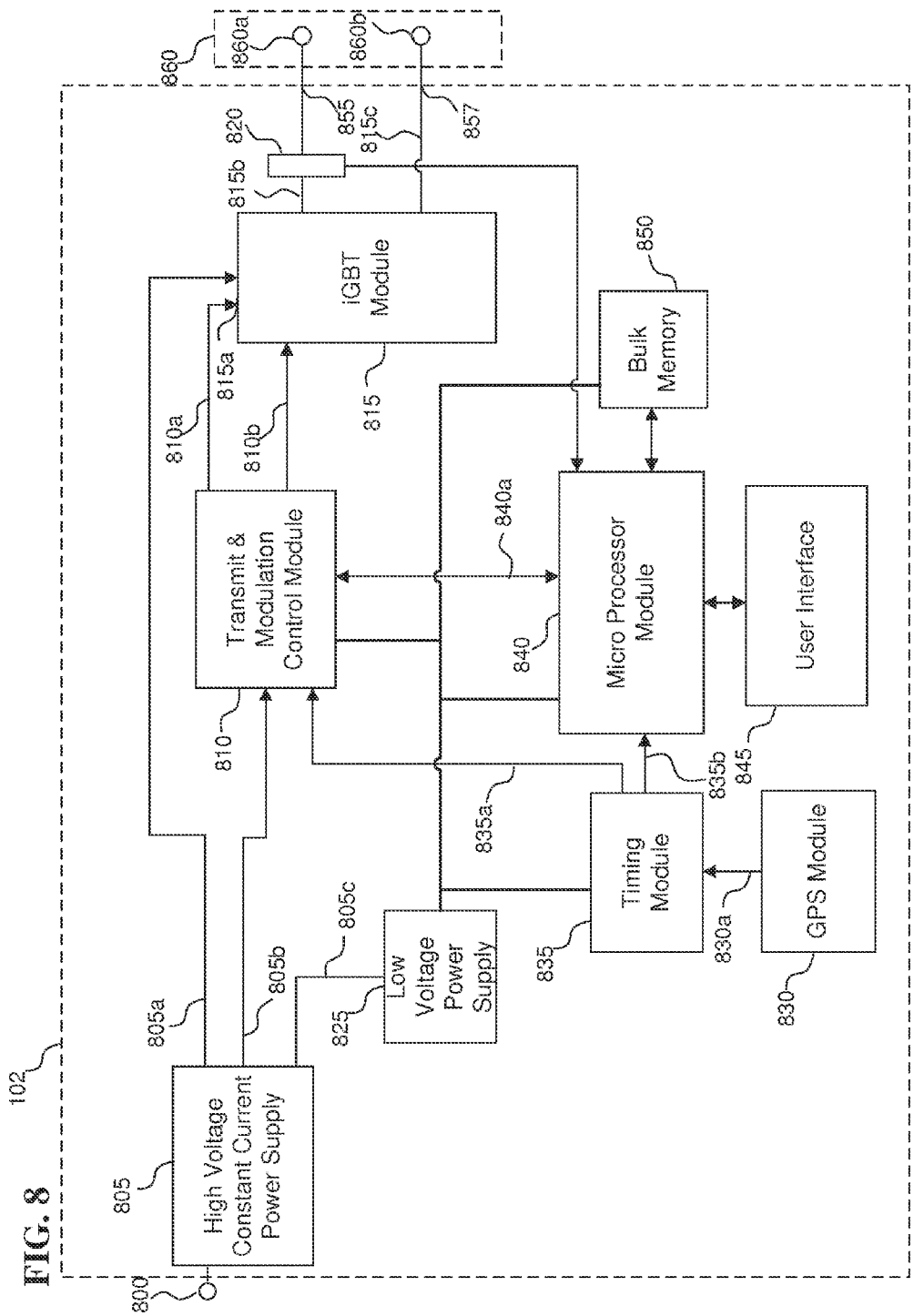
FIG. 8 is a block diagram of the modules that are contained within the transmitter system

Referring now to FIG. 8, the transmitter system 102 is supplied with an input power 800 in the range of 5 to 100 Kilowatts. The transmitter system contains a plurality of High Voltage Constant Current Power Supplies 805, which, in the preferred embodiment, is a Sorensen SG16000/33E manufactured and sold by AMETEK Programmable Power, Inc. —San Diego, 9250 Brown Deer Road, San Diego, Calif. 92121. A conditioned positive power output 805b is passed to the Transmit & Modulation Control Module 810. A conditioned negative power output 805b is passed through a pair of MOSFETs 915 and 920, arranged in parallel (shown in FIG. 9). The modulated power output 810a is passed to a DC bias input 815a of an iGBT Module 815. In the preferred embodiment, the iGBT Module is the PP100T120 manufactured and sold by POWEREX Inc., 200 Hills Street, Youngwood, Pa. 15687. A plurality of isolated control signals 810b are passed to the iGBT module 815.

A conditioned power output 805c is passed to a Low Voltage Power Supply 825. The low voltage power supply 825 provides power for the modules in the transmitter system 102.

A GPS Module 830, of the same design and function as the GPS Module 255 (shown in FIG. 2) generates a synchronization pulse 830a that is passed to a timing module 835. The timing module 835 generates a clock signal 835b for a microprocessor module 840. The microprocessor module 840 is connected to a User Interface 845. The microprocessor module 840 is connected to the Bulk Memory 850 where operational data is stored. The microprocessor module 840 communicates with the transmit and modulation control module 810, through a synchronous serial signal 840a.

The User Interface 845 allows the operator to adjust operational parameters of the transmitter system 102.

The timing module 835 generates a clock signal 835a that is passed to the Transmit and Modulation Control Module 810. The iGBT module 815 has an output 815b and a second output 815c. The outputs 815b and 815c are coupled to the transmitter system 102 outputs 855 and 857 respectively. The outputs 855 and 857 are connected to a pair of ground stakes 860a and 860b respectively. The ground stakes 860a and 860b are part of a transmit dipole 860. The ground stakes are copper coated ceramic stakes that are driven into the ground to form the dipole 860. The output 815b passes through a current transducer 820. The current transducer 820 is used to monitor the transmitted power. In the preferred embodiment, the current transducer 820 is the LEM-60 820, manufactured and sold LEM U.S.A., Inc., 11665 W. Bradley Road, Milwaukee, Wis. 53224.

In an alternative embodiment a Software Defined Receiver (SDR) as depicted in FIG. 3, and of the same design and function, is connected between the current transducer 820 and the microprocessor module 840. The SDR allows for accurate determination of both phase and amplitude of the transmitted signal. This is important for use in a phased array transmission system.

In a second alternate embodiment a power matching network (not shown) is connected to the outputs 855 and 857. The power matching network is used to ensure that the dipole ground stakes, 860a and 860b, are coupled effectively with the surface of the earth, reducing the required transmit power for the system to survey at extreme depths and when surface impedances are low. The typical matching network for this application is designed to resonate at 0.5 Hz to 1 hz, and will match 5 Ohms to 1 K Ohm loads to 100 Ohms.

In a third alternate embodiment the Timing Module 835 can be replaced by a rubidium atomic clock.

In a fourth alternate embodiment the GPS Module 830 can be removed, and synchronization between all transmitter and receiver clocks can be achieved through the transmission of a test signal.

Figure 9:
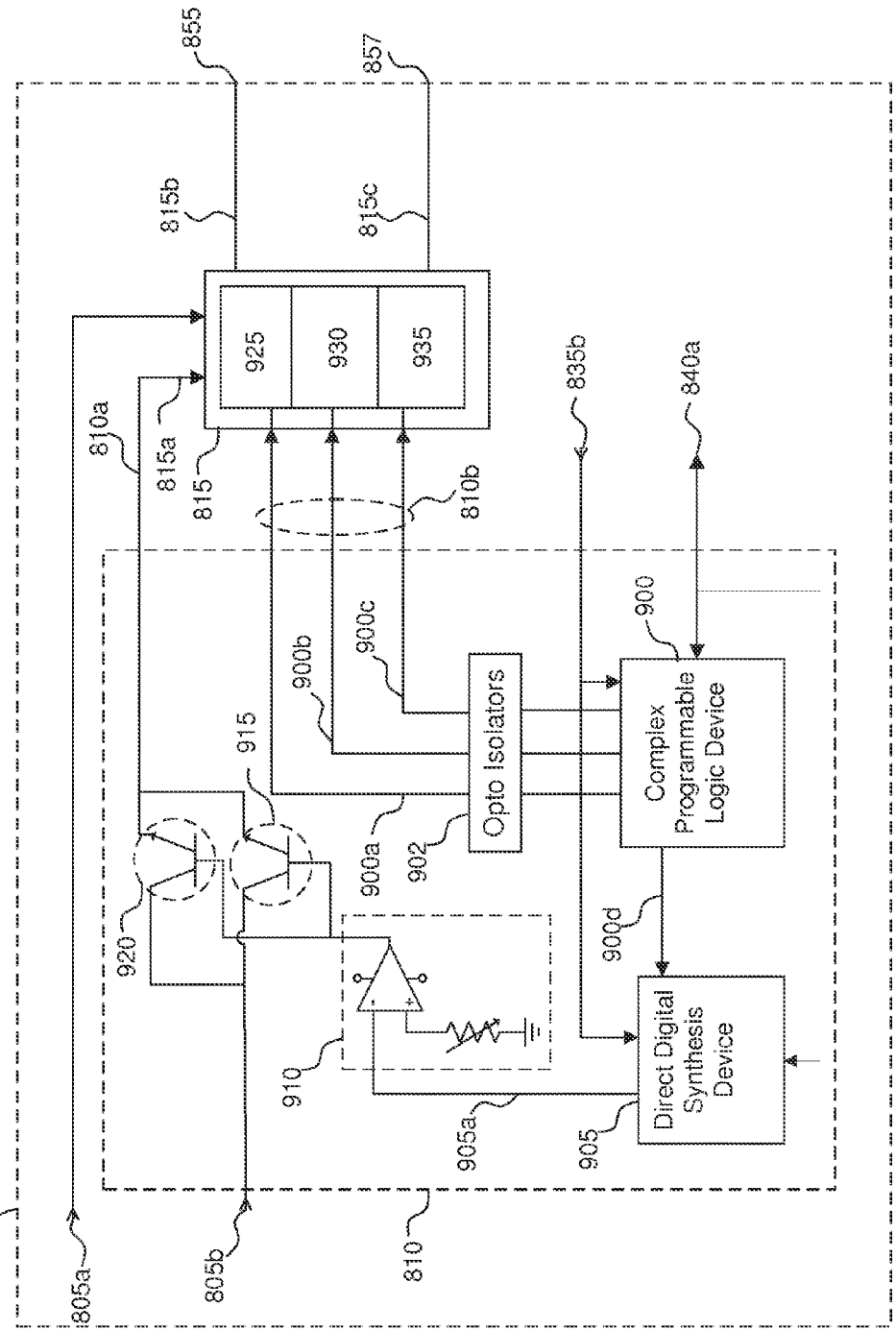
FIG. 9 is block diagram of the transmit and modulation control module of the transmitter system In the figures, the left-most significant digit(s) in the reference numerals denote(s) the first figure in which the respective reference numerals appear.

Referring now to FIG. 9, the transmit and modulation control module 810 controls the output signals 815b and 815c that are passed to the outputs 855 and 857 respectively. A Complex Programmable Logic Device (CPLD) 900 contains VHDL code that creates iGBT control signals 900a, 900b, and 900c that activate the three pairs of iGBT power switches within the iGBT Module 815. The CPLD 900 communicates with the micro processor module 840 (see FIG. 8) through the synchronous serial communications signal 804a and provides timing information to the micro processor 840. The CPLD 900 is synchronized by the clock signal 835b, which in turn synchronizes the iGBT control signals 900a, 900b, and 900c. The signal 900a activates the iGBT power switch pair 925 connected to the output 857 and the signal 900c activates the iGBT power switch pair 935 for the output 855. The third signal 900b is used when a dummy load is required, and activates the iGBT power switch pair 930. Each of the iGBT control signals are passed through a plurality of Opto Isolators 902. The process of activating the power switches 925 and 930 within the iGBT module 815, to create a pulsed transmission signal at the output dipole 860 (see FIG. 8) can be understood by a person who is skilled in the art of CSEM transmitter design.

The CPLD 900 gates the output of a Direct Digital Synthesis device (DDS) 905 through a modulation signal 900d. The DDS device 905 is of the same design as the DDS device 515 shown in FIG. 5. The CPLD 900 contains VHDL code that creates a modulation signal 900d. In the preferred embodiment the modulation signal 900d is pseudo random modulation. The DDS device 905 generates a 1 Mhz modulated signal 905a that is passed to a High Current Operational Amplifier (HCOA) 910. The HCOA 910 allows for adjustment of the modulated signal 905a before it is passed to a pair of power MOSFETs 915 and 920 arranged in parallel. The power MOSFETs 915 and 920 are rated to 1.5 KW each. A plurality of the power MOSFETs are implemented when higher powers are required.

Since the MOSFETs 915 and 920 modulate up to only 10% of the power transferred through the iGBT module 815, a single pair can be used for transmitted powers of less than 15 KW. Seven (7) pairs of power MOSFETs would be required to modulate 100 KW of transmitted power. The modulated power signal 810a is passed to a DC terminal in the iGBT module 815.

In an alternate embodiment the modulated signal 900a is not pseudo random, and can be of a form that allows the receiver systems 100 to distinguish transmitted signal from noise.

In operation, a plurality of receiver systems 100 are arranged as depicted in either FIG. 1A or FIG. 1B. The receiver systems 100 are all synchronized through the synchronization pulse generated by the GPS module 255 in each receiver. In addition, location information is stored from the GPS module 255, along with the SEG D data saved in the bulk memory 615. The CSEM transmitter 102 is also capable of synchronization with the receiver systems 100 from the synchronization pulse 830a.

The transmitter system 102 generates a periodic transmit pulse that consists of a low frequency square wave with a pre-defined modulate signal imposed on the square wave. The pulse can be transmitted over a wide range of time periods, but typically is pulsed once per second. The modulated signal can be used to help with receiver signal processing. This technique can be understood by a person skilled in the art of processing CSEM survey data.

In an alternate embodiment, the current invention allows for the distribution of a plurality of transmitter systems and associated transmitter dipoles in an arrangement that allows for the generation of wave fronts that are directional. This can be effected through the precise control of the phase of each transmitted pulse and the correct co-location of each transmitter dipole. This technique can be understood by any person skilled in the art of amplitude modulated radio frequency phased array antennas.

Once a transmitted wave has been generated, each receiver detects the air wave, and attenuates the data to the ADC 600 present in each receiver system 100. Once the air wave has passed, each receiver system begins collecting data.

The E field dipole receiver 200 is designed to detect changes in the electric field created by an active transmitter pulse or passively from spontaneous potentials.

The H field loop antenna 205 is designed to detect changes in the ambient magnetic field in all orientations, except those parallel to the earth's surface, caused by induced eddy currents in underground formations. The eddy currents induce magnetic fields that are of short duration. The loop antenna 205 is of typical design for this application, and varies in diameter dependent on depth of investigation required. The diameter can exceed 150 meters. The magnetometer card 240 provides the last axis of information that is combined with the magnetic field loop antenna 205 axis information, to determine the source of the arriving magnetic waves.

The received difference signals ES3 and HS3 are processed as depicted in FIGS. 3 and 4 respectively. Referring to FIG. 3, the combination of the mixer circuit 330, Cohn filter and diplexer circuit 345, and the enhanced Tayloe detector circuit 355, result in phase coherent, noise-free data.

In operation the Cohn filter and diplexer circuit 345 is used in the band pass mode, and software executing on the microprocessor 605 controls the center frequency of the bandpass filter by controlling the up-converter frequency in the mixer circuit 330. The skirts of the Cohn filter and diplexer circuit 345 are very tightly defined and drop off at better than −70 db per decade, and allow the SDR 225 to provide a bandpass that can be set to different frequencies of interest. The frequency content of the incoming signal ES3 present at 310 is reduced to the range of interest at the up-converted frequency. The Cohn filter and diplexer circuit 345 is also known as a minimum loss filter, and has very high Q factors, in excess of 10,000.

The benefit of using this technique to filter out unwanted signals from ES3 and HS3 can be understood by any person skilled in the art of superheterodyne-based Software Defined Receivers. In addition, this method brings added benefit to the post-processing of data, because the frequency of the recorded data is tightly defined, and provides additional constraints for data processing.

The signal that results from the Cohn filter and diplexer circuit 345 has low noise content and low phase shift. The signal passes through the enhanced Tayloe detector 355, is down converted as a result of the function of the Tayloe detectors, and is split into amplitude (in-phase signal) and phase (quadrature signal) components, again with low noise content and good phase accuracy.

The data in the form of amplitude and phase pairs for each of the electric and magnetic fields is passed to the ADC 600.

It is an important element of the current invention that each channel of data being processed by the ADC 600 in the control module 250 has its sample start time synchronized in the pico second, or shorter, time frame. In addition, due to conductor line latencies, the time-critical ADC conversions all occur on a single chip, the AD 1278, and are concurrent to within 50 pico seconds. There are other latencies in the system, partly due to cable length variations and other factors that must also be measured. This is done by applying a test signal from the transmitter that is synchronized with the receivers, using a precise clock, and monitoring for arrival times at each of the ADC 600 inputs, and synchronized against a precise clock. This procedure must be performed for all receivers in the system and a calibration factor is programmed for each channel in the factory.

The system collects amplitude, phase and point potential data from the magnetic (H) field that is stored in the bulk memory 615. The phase data storage of the H field is unique to the current invention.

The present invention benefits from the use of the enhanced Tayloe detector circuit 355 in each of electric and magnetic receiver channels, and the high speed ADC 600, because the recorded data has a low signal-to-noise ratio, better than −120 dbm, and low phase distortion, less than 0.01%. The data stored in the bulk memory 615 includes additional data that creates a rich data set. The additional data items are a magnetic quadrature output signal Hq present at 475, a surface current signal ES6 at output 325, and a magnetic point potential signal HS6 at output 425. The data are all synchronized to the system clock, or to an atomic clock, or to a GPS synchronization pulse. The precise timing of all ADC acquisition cycles allows for improved resolution at sub-surface depths, beyond 10,000 meters. In addition, reduced "bin" size is achieved.

A "bin" in this context is a location of a finite size, usually a cube, within a mathematical representation (2D, 3D, or 4D array) of sub-surface geology. The bin is used to accumulate some predetermined value or combination of values for the location in the sub-surface geology.

The preceding is merely a detailed description of one (or more) embodiments of the invention. Numerous changes to the disclosed embodiments can be made in accordance with the disclosure herein, without departing from the spirit or scope of the invention. The preceding description, therefore, is not meant to limit the scope of the invention. Rather, the scope of the invention is to be determined by only the appended claims and their equivalents.

I claim:

1. A method, comprising:
   placing a plurality of receiver systems on a surface of the earth to form a receiver matrix;
   placing a controlled source electromagnetic transmitter on the surface of the earth;
   synchronizing, by the plurality of receiver systems and the transmitter, clocks in the plurality of receiver systems and the transmitter;
   detecting changes in electric and magnetic fields of sub-surface formations induced by a controlled source electromagnetic pulse; and
   reducing noise in signals received by the plurality of receiver systems, comprising:
      up-converting received signals at a received frequency to a higher frequency;
      filtering noise in the up-converted received signals to produce filtered signals; and
      down-converting the filtered signals from the higher frequency to the received frequency.

2. The method of claim 1, wherein synchronizing, by the plurality of receiver systems and the transmitter, clocks in the plurality of receiver systems and the transmitter comprises:
   synchronizing clocks in the plurality of receiver systems and the transmitter to a GPS signal.

3. The method of claim 1, wherein synchronizing, by the plurality of receiver systems and the transmitter, clocks in the plurality of receiver systems and the transmitter comprises:
   synchronizing clocks in the plurality of receiver systems and the transmitter to an atomic clock.

4. The method of claim 1, further comprising:
   detecting an air wave; and
   attenuating the signals received by the plurality of receiver systems until the air wave has passed.

5. A system, comprising:
   a plurality of controlled source electromagnetic receivers, operatively distributed across a surface of the earth, each comprising:
      timing circuitry configured to synchronize the receiver to a common time source, and
      noise reduction circuitry, comprising:
         frequency up-conversion circuitry, configured to up-convert received signals at a received frequency to a higher frequency;
         filter circuitry, coupled to the frequency up-conversion circuitry, configured to remove noise signals from the up-converted received signals, producing filtered signals; and
         frequency down-conversion circuitry, configured to down-convert the filtered signals to the received frequency; and
   a controlled source electromagnetic transmitter operatively positioned relative to the plurality of controlled source electromagnetic receivers, comprising:
      timing circuitry configured to synchronize the transmitter to the common time source.

6. The system of claim 5, wherein the common time source is a GPS signal.

7. The system of claim 5,
   wherein the timing circuitry of the plurality of controlled source electromagnetic receivers comprises an atomic clock, and
   wherein the timing circuitry of the controlled source electromagnetic transmitter comprises an atomic clock.

8. The system of claim 5, wherein the timing circuitry of the plurality of controlled source electromagnetic receivers comprises:
- an oscillator circuit that produces an oscillator signal;
- a complex programmable logic device configured to divide the oscillator signal into a first clock signal and a second clock signal;
- a GPS module, coupled to the complex programmable logic device; and
- a direct digital synthesis circuit, coupled to the complex programmable logic device, configured to receive the first clock signal.

9. The system of claim 8, wherein the direct digital synthesis circuit is configured to create a third clock signal, in phase with the oscillator signal, and a fourth clock signal, 90 degrees out of phase with the oscillator signal.

10. The system of claim 8, wherein the GPS module synchronizes the timing circuitry of each of the plurality of controlled source electromagnetic receivers with the timing circuitry of each other of the plurality of controlled source electromagnetic receivers and the timing circuitry of the controlled source electromagnetic transmitter.

11. The system of claim 8, wherein each of the plurality of controlled source electromagnetic receivers further comprises:
- an antenna; and
- an analog-to-digital converter circuitry, coupled to the antenna,
- wherein the analog-to-digital converter circuitry is clocked by the second clock signal.

12. The system of claim 11, wherein each of the plurality of controlled source electromagnetic receivers further comprises:
- a clipper circuit, coupled between the antenna and the analog-to-digital converter circuitry, configured to attenuate signals received from the antenna;
- a magnetometer; and
- a control module coupled to the magnetometer and the clipper circuit, configured to trigger the clipper circuit to attenuate signals received from the antenna until after an air wave generated by the controlled source electromagnetic transmitter has passed the magnetometer.

13. The system of claim 5, wherein each of the plurality of controlled source electromagnetic receivers further comprises:
- an antenna; and
- a software-defined receiver, coupled to the antenna, programmed to receive signals from the antenna and produce an in-phase output signal and a quadrature output signal,
- wherein the noise reduction circuitry is part of the software-defined receiver.

14. The system of claim 13, wherein the software-defined receiver comprises:
- an Tayloe detector circuit, driven by an in-phase clock signal and an out-of-phase clock signal.

15. A controlled source electromagnetic transmitter for use with a plurality of controlled source electromagnetic receivers, comprising:
- a constant current power supply;
- a timing module, synchronized with a timing source used by the plurality of controlled source electromagnetic receivers;
- a transmit and modulation control module, coupled to the timing module;
- a programmable control device, coupled to the timing module and the transmit and modulation control module;
- a switching circuit, synchronized by the timing module;
- a current transducer driven by the switching circuit;
- a software-defined receiver coupled between the current transducer and the programmable control device; and
- a transmit dipole, driven by the switching circuit.

16. The controlled source electromagnetic transmitter of claim 15, further comprising:
- a GPS module, coupled to the timing module,
- wherein the timing module is synchronized to a GPS signal generated by the GPS module.

17. The controlled source electromagnetic transmitter of claim 15, wherein the transmit and modulation control module comprises:
- a complex programmable logic device, driven by a timing signal from the timing module; and
- a direct digital synthesis circuit, driven by the timing signal from the timing module and the complex programmable logic device.

* * * * *